United States Patent
Schell et al.

[19]

[11] Patent Number: 6,155,208

[45] Date of Patent: Dec. 5, 2000

[54] ELECTRONIC ANIMAL CONTROL APPARATUS

[75] Inventors: Jerry L. Schell, Chanute, Kans.; Jerry C. Schmitt, Independence, Mo.

[73] Assignee: AgriTech Electronics, LC, Chanute, Kans.

[21] Appl. No.: 09/157,657

[22] Filed: Sep. 21, 1998

Related U.S. Application Data

[60] Provisional application No. 60/059,738, Sep. 22, 1997.

[51] Int. Cl.$^7$ ..................................................... A01K 15/04
[52] U.S. Cl. ........................................... 119/720; 119/908
[58] Field of Search ..................................... 119/720, 721, 119/859, 908; 340/517, 540, 573, 574

[56] References Cited

U.S. PATENT DOCUMENTS

| | | | |
|---|---|---|---|
| 5,241,923 | 9/1993 | Janning | 119/721 |
| 5,435,271 | 7/1995 | Touchton et al. | 119/721 |
| 5,815,077 | 9/1998 | Christiansen | 119/720 |
| 5,870,973 | 2/1999 | Touchton et al. | 119/720 |
| 5,913,284 | 6/1999 | Van Curen et al. | 119/720 |
| 5,963,130 | 10/1999 | Schalger et al. | 340/574 |
| 5,982,291 | 11/1999 | Williams et al. | 340/540 |
| 6,019,066 | 2/2000 | Taylor | 119/720 |

*Primary Examiner*—Peter M. Poon
*Assistant Examiner*—Elizabeth Shaw

[57] ABSTRACT

Improvements in a fenceless electronic animal control system comprising portable stimulation units attached to the animal and rf transmitters defining an area, with the stimulation of the animal based on the transmission received by the portable unit. The transmitters transmit signals containing multiple codes to permit selective stimulation of predefined categories of animals and to insure a continuous electronic signal boundary. Portable units include the capability of transmitting signals in response to in inquiry signal from a separate transmitter thereby providing confirmation of the location and identify of the animal.

13 Claims, 5 Drawing Sheets

ELECTRONIC ANIMAL CONTROL APPARATUS

This application claims the benefit of provisional application Ser. No. 60/059,738, filed Sep. 22, 1997.

BACKGROUND OF THE INVENTION

The present invention relates to an improved animal containment system utilizing audio and electric stimulation to control the location of livestock and other animals.

U.S. Pat. No. 5,408,956, incorporated herein by reference, describes a new livestock control alternative that uses animal ear tags to administer audio and electric stimuli when an animal enters the range of a field transmitter. In this prior art system, the transmitter continuously generates a stimulation code that is received by an ear tag receiver when the ear tag containing the receiver enters the effective range of the transmitter. Tests have proven the effectiveness of this system, but also have identified the sensitivity of transmitter range to varying environmental conditions. On a given signal power setting transmitter range (and thus the exclusion range) tends to vary (sometimes significantly) over time.

U.S. Pat. No. 5,241,923, incorporated herein by reference, describes an electronic inclusion system using a series of transponders to define the boundary of an area within which animals are to be restrained. A substantial shortcoming of this system, however, is that environmental changes in transmitter range could result in gaps between the areas covered by adjacent transmitters.

Both of these systems are designed to exclude (or include) all animals from (or within) the specified areas. In many cases, however, it is not appropriate to treat all animals alike. It may be desirable to move certain animals into a defined area, while excluding other animals from that area. Neither of the prior art systems provides a means for selective exclusion or inclusion of identified animals or suggests the desirability of such selective treatment.

Similarly, it is highly desirable to have the capability of confirming the presence of animal within a specified area. The only means of doing so, however, requires physical observation of the animals and their identifying markings. There is no effective system for electronically verifying the presence of animals.

SUMMARY OF THE INVENTION

The present invention related to novel improvements to the systems described in U.S. Pat. Nos. 5,408,956 and 5,241,923. These systems describe animal containment systems utilizing animal-mounted receivers that provide stimulation in response to a signal received from one or more stationary boundary transmitter. The improvements relate to refinements in and enhancements to the transmission of information from the boundary transmitters. The improvements permit selective stimulation of individual animals, insure complete coverage of the desired boundary, and provide a means for verifying the presence of identified animals.

Multiple transmitter stimulation codes are used to selectively stimulate animals and to permit the sorting of animals. Each field transmitter unit is designed to transmit one or more of a plurality of available stimulation codes. A given ear tag is programmed to be activated by a single stimulation code. Depending upon the codes transmitted by the field transmitter unit, certain ear tags may not be activated upon entering the range of the field transmitter unit. Thus, for example, the ear tags attached to cows and bulls might be activated to exclude animals from a feed bunk, while the ear tags worn by calves would not be activated thus allowing the calves to feed from the bunk.

A self calibrating/monitoring variable transmitter power control insures the absence of gaps between neighboring field transmitter units, while minimizing power consumption to the greatest extent possible. Each field transmitter unit includes additional transmission capability for transmitting calibration and identification codes to neighboring field transmitter units. Each field transmitter unit also includes a receiver for receiving calibration and identification codes from neighboring field transmitter units. This communication between field transmitter units permits optimum adjustment of transmission signal strength to minimize power consumption while insuring continuous signal coverage along a series of field transmitter units. Thus if environmental changes decrease the effective range of a field transmitter unit and leave a gap between neighboring field transmitter units, the improved system automatically increases transmitter power to close the gap. Similarly, if effective range increases, transmitter power is reduced to avoid unnecessary power consumption and stimulation of animals beyond the desired exclusion range. A visual display on each field transmitter unit permits operator confirmation of exclusion zone continuity, and remote monitoring of continuity is also possible.

Finally, the improved system provides a means for verifying the identity of the animals present in an area. An animal-mounted transmitter is activated when the animal approaches a stationary identification transmitter and the activated animal-mounted transmitter transmits a code identifying the animal. Receiver and storage means in the stationary identification transmitter receives and stores the data received and provides an output identifying the animals that have entered the proximity of the stationary identification transmitter. Similarly, using a mobile unit a user could locate a lost animal in heavy cover by transmitting a signal from the mobile unit to activate the animal-mounted transmitter.

DETAILED DESCRIPTION OF THE INVENTION

Figure 1:
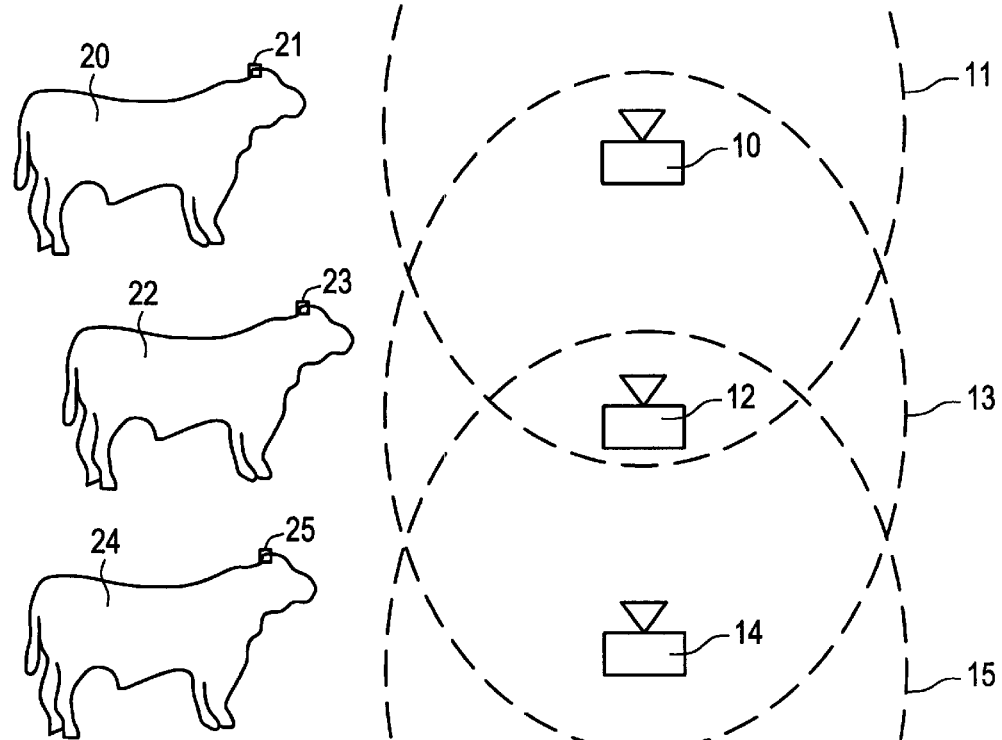
FIG. 1 is a block diagram showing the principal components of the present invention

FIG. 1 shows a diagram depicting the elements of the preferred embodiment of the present invention. Multiple field transmitter units, 10,12, 14, define exclusion zones 11,13,15. Animals 20,22,24 grazing outside the exclusion zone wear ear tags 21,23,25. The design and function of the field transmitter units and ear tags are described in detail in U.S. Pat. No. 5,408,956 previously incorporated herein be reference. Ear tag 21 is further programmed to activate its audio and electric stimulation only in response to a specific group stimulation code (for example, Code A). Ear tags 23 and 25 are programmed to respond to different group stimulation codes (for example Codes B and C, respectively). Ear tags 21,23,25 might each be attached to animals in different categories or for which different handling is appropriate.

Figure 2:
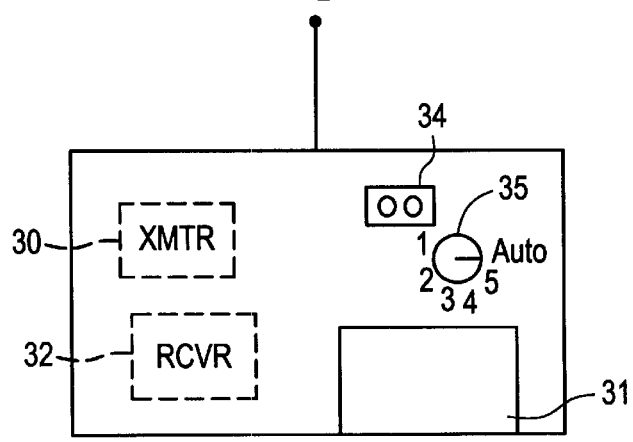
FIG. 2 is a block diagram showing the transmitter of the present invention

Referring to FIG. 2, each field transmitter unit includes a power supply (battery) 31, and a transmitter 30 capable of transmitting multiple group stimulation codes and calibration and identification codes. The field transmitter unit also includes a receiver 32 for receiving calibration and identification codes from neighboring field transmitter units, as described in more detail below.

Figure 3A:
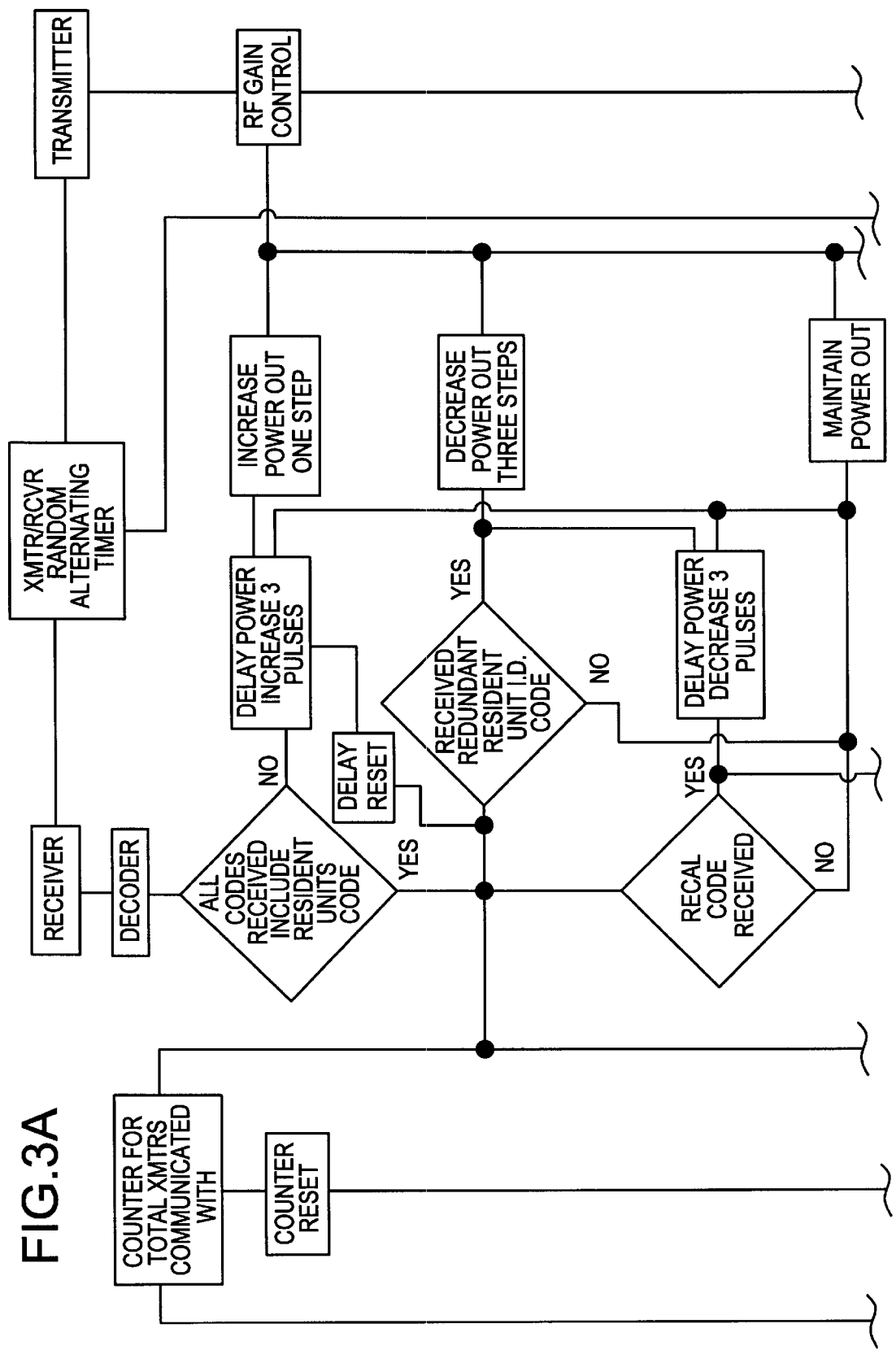
FIG. 3 is a flowchart showing the transmitter power control logic
Figure 3B:
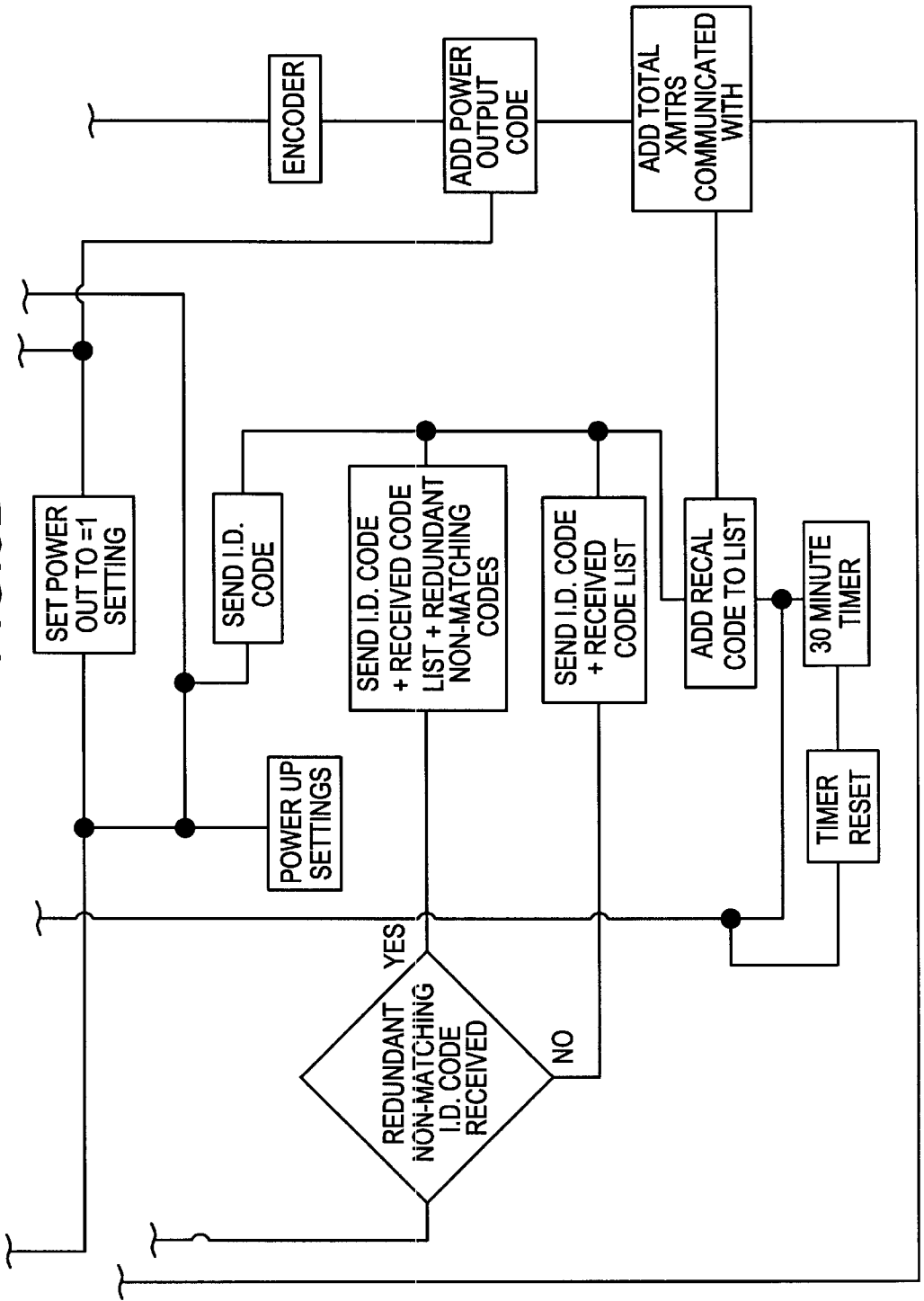

Referring to the flowchart shown in FIG. 3, each field transmitter unit transmits a signal including some or all of the following components: (1) system id code; (2) resident transmitter id code; (3) first adjacent transmitter id code; (4) second adjacent transmitter id code; (5) third adjacent transmitter id code; (6) fourth adjacent transmitter id code; (7) fifth adjacent transmitter id code; (8) redundant nonmatching id code; (9) recalibrate code: (10) power output setting; (11) first group stimulation code; (12) second group stimulation code; (13) third group stimulation code.

Figure 5:
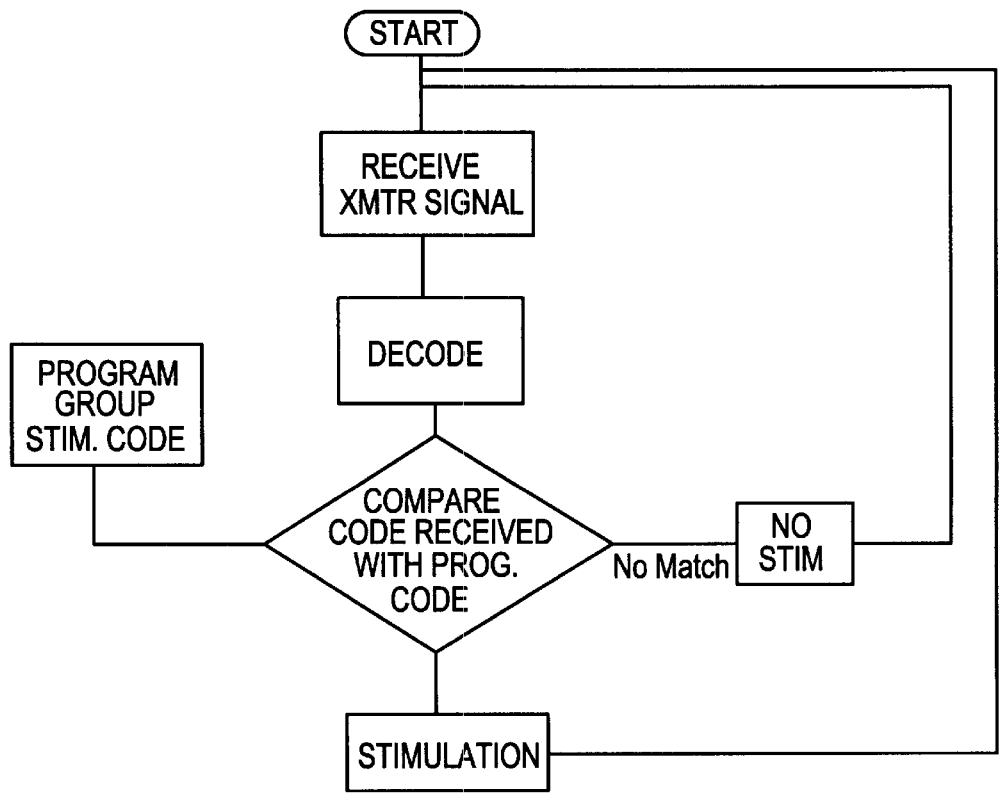
FIG. 5 is a flowchart showing the selective ear tag logic

As described in more detail in U.S. Pat. No. 5,408,956, each ear tag unit includes a receiver for receiving the transmission from a field transmitter unit. The present invention includes additional logic circuitry shown in FIG. 5 which permits selection of the specific group stimulation code that will activate the ear tag stimulation circuitry. The selection of the group stimulation code can be preset upon manufacture of the ear tag, or could be manually selected by the operator as described in more detail below. When a signal is received by the ear tag receiver it is decoded and the group stimulation code is compared with the group stimulation code for that ear tag and activates that ear tag stimulation circuits only when the two codes match.

Field transmitter units 10, 12 and 14 in FIG. 1 transmits group stimulation codes B and C (in this example the third group stimulation code listed above is not transmitted.) Thus the animals with ear tags 23 and 25 (programmed to respond to stimulation codes B and C) receive stimulation when they enter the exclusion zone. Animals with ear tag 21, however, can enter the exclusion zone and approach the field transmitters 10, 12 and 14 (and cross the boundary defined by the line of these transmitters) without stimulation since ear tag 21 was programmed to respond to stimulation code A which is not transmitted by units 10, 12, and 14.

For example, the animals to be fitted with the ear tags can be divided into three categories (example—calves, yearlings, cows and bulls). Each category will be assigned a unique stimulation code. This will allow the categories to be treated differently (example—the calves could be allowed to access a feed bunk, but the other two categories would be denied access). For example, calves would be fitted with ear tags using group stimulation code B, yearlings code C and the cows and bulls code A.

Figure 4:
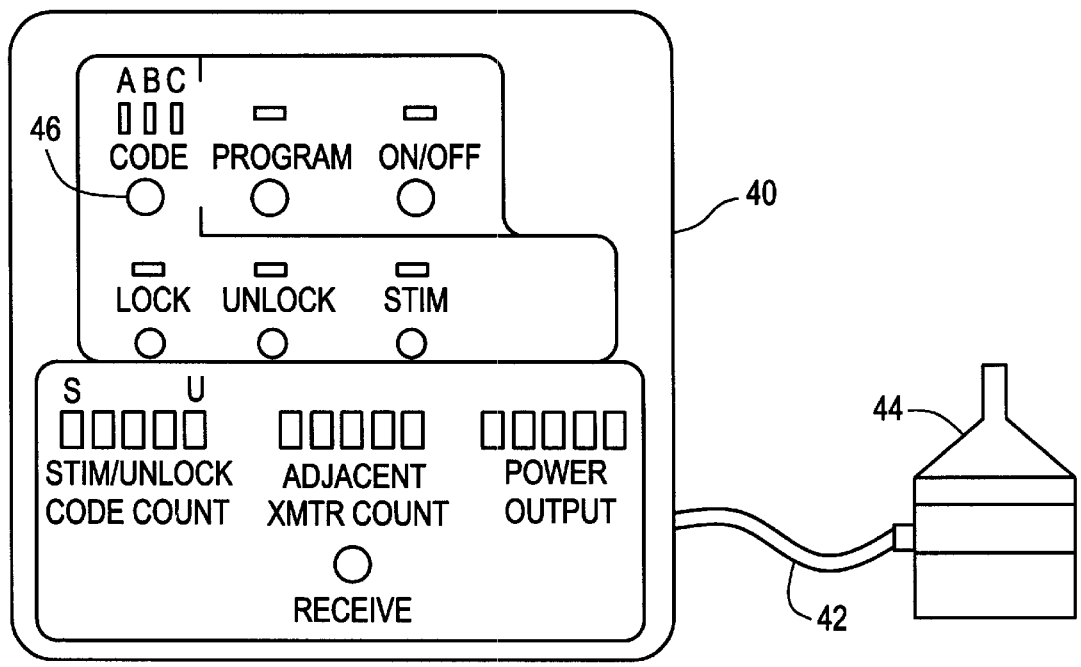
FIG. 4 is a drawing showing the external features of the hand held control unit

The hand held test/control unit 40 shown in FIG. 4, and generally functioning in the manner described in U.S. Pat. No. 5,408,956 is used to program the ear tags. An ear tag code programming cable 42 is provided that connects the ear tag 44 to be programmed to the handheld test/control unit. A code selector switch in the handheld test/control unit 40 is used to select one of three ear tag code. The "program" function is activated buy a switch on the handheld test/ control. For example, the ear tags for the calves (Code A) would be attached to the handheld test/control unit 40 by cable 42, the code selector switch 46 would be set to "Code A", and the program button on the handheld test/control unit 40 would be depressed.

As described in U.S. Pat. No. 5,408,956, an "Unlock" transmitter is installed in an area frequently visited by the animals (water supply, salt or feeding area, etc.) for each containment area. This will allow animals with ear tags that are locked to become unlocked and operable again. The "Unlock" function can be programmed to apply to units having a specified group stimulation code, although typically the "Unlock" transmitter would be programmed with all group stimulation codes being used.

Field transmitter units 10, 12, and 14 are placed on level ground a specified distance apart. For proper operation of the containment system, it is critical that the signals transmitted by adjacent transmitter units overlap. Otherwise a gap would exist through which animals could pass without stimulation.

In a preferred embodiment the transmitter output attenuator control can be controlled both manually and automatically. If the transmitter is set to one of the manual settings (represented by the numerals on setting dial 35 in FIG. 2, the attenuation level is fixed in that setting and the signal coverage area will vary with ambient conditions. This feature will typically be used for standalone transmitters (used, for example, in an animal feed bunk, pond, unlock transmitter at salt or water location, etc,).

If the transmitter output attenuator control is set in the automatic mode, the transmitter will automatically recalibrate and monitor the adjacent transmitters for continual communication and insure continuity (regardless of growing or shrinking transmitter coverage) as described in more detail below. In the preferred embodiment there are ten attenuation levels for automatic internal control.

Each transmitter is assigned an identification code (the "resident transmitter id code"). In operation (as shown in FIG. 3) the resident unit receiver receives transmissions from adjacent transmitters, sums the number of communicating transmitters and transmits a signal identifying the other communicating transmitters. If codes are not received from all adjacent transmitters, the power output is increased. If a unit receives a signal from a nonadjacent transmitter a "redundant nonmatching id code" is transmitted identifying the nonadjacent unit. If a redundant nonmatching id code is received identifying the unit receiving a particular transmission, the power output of that unit is decreased. In addition, at a specified recalibration interval (30 minutes) power is reduced (in the preferred embodiment by two power increments) and increased only to the point of receiving signals from all adjacent transmitters.

Thus if transmitter 12 does not receive signals from transmitters 10 and 14 the power output of transmitter 12 will be increased. If, prior to the recalibration interval, transmitter 14 receives a code from transmitter 10 and well as transmitter 12, transmitter 14 will include that information in the "redundant nonmatching id code" in its next transmission. When that transmission is received by transmitter 12, transmitter 12 will transmits a signal identifying, among other things, the transmitters with which it is in contact (transmitters 10 and 14) and transmitting a "redundant nonmatching code" to indicate that transmitter 14 is also receiving a signal from transmitter 10. When the transmission from transmitter 12 is received by transmitter 10, programming in transmitter 10 will reduce transmitter 10's signal strength until in no longer receives the redundant nonmatching id code.

A visual display 34 on field transmitter unit 10 permits operator confirmation of exclusion zone continuity. The display indicates the number of neighboring transmitters from which calibration code signals are being received. Alternatively, or in addition to the visual display on the field transmitter unit, the handheld test/control unit can include appropriate circuitry and display to verify transmitter contact with the appropriate number of neighboring transmitters.

To begin installing the transmitters to create a barrier, a battery would be installed in the first transmitter unit only. Using the hand held test/control unit, each transmitter would be tested after placement, starting with the second transmitter and continuing to the opposite end of the barrier. The handheld display indicates the number of transmitters from which the handheld unit receives transmissions. At least 15 seconds after transmitter placement, the operator would press the RECEIVE button on the hand held test/control unit while standing approximately 25' away from the transmitter last placed, but not between the transmitters and insure the display illuminates only one indicator light for the adjacent transmitter count (the third and fourth transmitters in the formed line may indicate two for the adjacent transmitter count). This indicates the last transmitter placed is communicating with the previous one(s) placed. If the end of the transmitter line must connect to an existing fence line or connects into itself, the last transmitter placed must have equal spacing between the existing fence line or barrier and the two adjacent transmitters. During the installation process each transmitter receives and stores the identification codes of the previously installed adjacent transmitter unit(s). In addition, during the recalibration process, the reception of signals (and the information contained in each) will effectively allow each transmitter to identify the does of the adjacent units with which it should be in contact.

Although FIG. 1 shows field transmitter unit 10 communicating with two neighboring field transmitter units 12 and 14, certain field transmitter unit configurations could require communication with more than two neighboring field transmitter unit units, in which case additional calibration code transmissions would be required.

Figure 6:
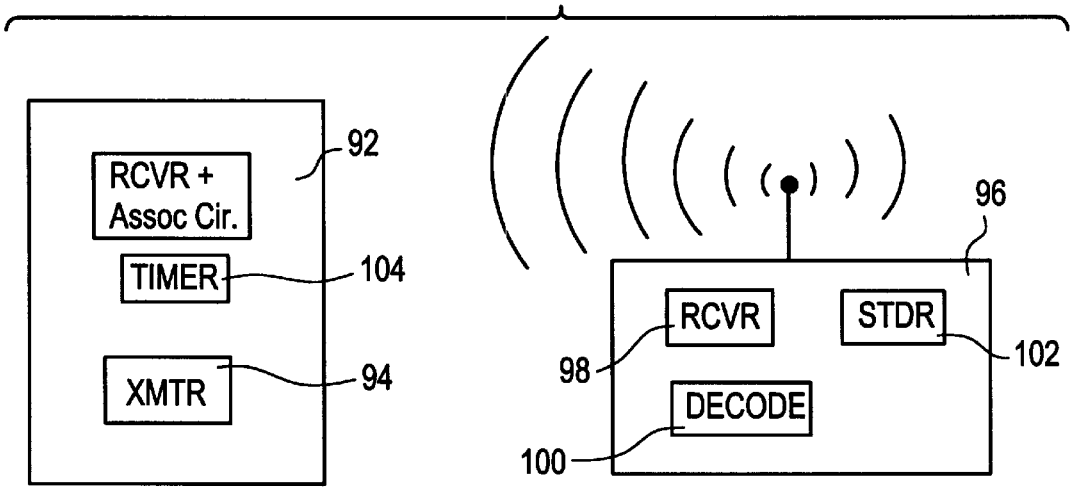
FIG. 6 is a block diagram showing the animal identification components of the present invention
Figure 7:
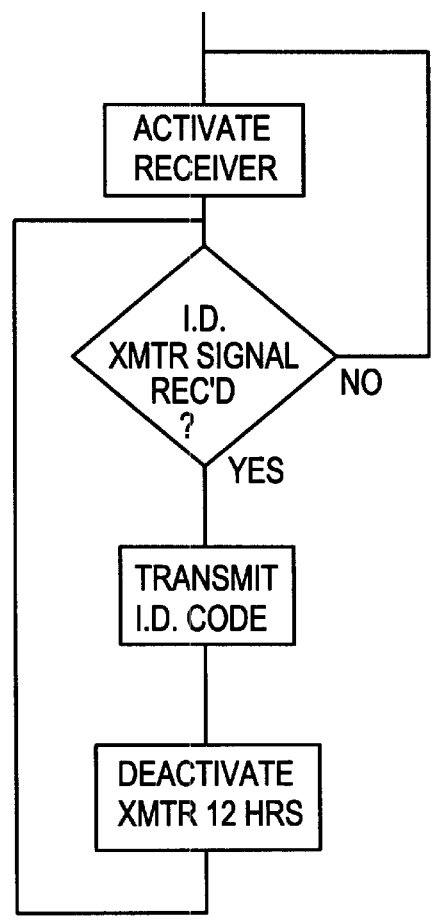
FIG. 7 is a flowchart showing the animal identification circuit logic

FIG. 6 shows the components of the present invention that permit the identification of specific animals present in an area. An animal wears ear tag 92 which contains, in addition to the receiving components and circuitry described above and in the patents incorporated herein by reference, signal transmitter 94. Stationary identification transmitter 96 continuously transmits an identification activation signal. When the animal approaches stationary identification transmitter 96, ear tag 92 receives the identification activation signal and, upon receipt of that signal, signal transmitter 94 transmits a signal including the animal's identification code. Receiving means 98 included in transmitter 94 receives the signal, decoding means 100 decodes that signal and storage means 102 stores the identification code and the time of its reception. Because the animal is in close proximity to the stationary identification transmitter (since it was close enough to receive the identification activation signal) a relatively low power transmission (with a correspondingly low power requirement) will be sufficient. It is also desirable to include timing means 104 in association with the ear tag signal transmitter 94 to deactivate the transmitter for a predetermined time interval to avoid unnecessary repetitious transmissions. FIG. 7 shows the circuit logic of the animal identification circuit, beginning with the reception of a signal by the receiving components described in more detail above. If the signal from the stationary identification transmitter is received, transmitter 94 is activated to transmit the animal's identification code, and then deactivated for a twelve hour time period.

In operation, the stationary identification transmitter 96 might be placed near a salt block, water source, or feed bunk the would be regularly visited by all animals. It may be necessary to place multiple stationary identification transmitters within the animal confinement area. When the animals approaches, its ear tag 92 receives the activation signal and, in response, transmits its identification signal. That signal is received, decoded, and stored in the stationary identification transmitter. The transmitter would then be deactivated for the desired interval, typically at least 12 hours.

Data stored in the stationary identification transmitter could be read by the operator either by connection to an output port on the stationary identification transmitter or be remote reading using appropriate (and well known it the art) transmission components in the stationary identification transmitter and a remote data receiver and activation transmitter. The resulting inventory listing would be highly useful to ranchers, bankers, and others needing accurate confirmation of the presence of the animals.

In some applications it may also be desirable to include with the animal identification components means for monitoring desired physiological parameters of the animal, such as body temperature, blood pressure, or heart parameters. Systems for monitoring these parameters are well known, such as the system described in U.S. Pat. No. 4,399,821, incorporated herein by reference and made a part of the disclosure hereof. Signals representing this physiological information could be included with the animal's identification code transmitted by transmitter 94 and received by receiver 98.

Although this preferred embodiment is based on the ear tag system described in U.S. Pat. No. 5,408,956, it should be noted that the inventions described could be applied to any system for receiving signals from transmitters and applying stimulation based on the reception of those signals, whether the receiving means is contained in an ear tag, nose tag, implant, or other means for attachment to the animal. Similarly, although some of the description relates to the exclusion of animals from defined areas, this invention is equally applicable to the inclusion of animals, or to an arrangement that is switchable (remotely or manually) between inclusion and exclusion.

We claim:

1. An apparatus for controlling the location of an animal comprising:

transmitter means for transmitting a radiofrequency signal;

receiving means for attachment to an animal capable of receiving said signal;

stimulation means attached to said animal for applying stimulation to the animal in response to signal received by said receiving means;

said signal including multiple predetermined codes.

2. The apparatus in claim 1, said stimulation means activated in response to one or more of said predetermined codes.

3. The apparatus in claim 2, wherein said predetermined codes are assigned based on animal characteristics that warrant different containment or exclusion treatment.

4. An apparatus for controlling the location of, and monitoring, an animal comprising:

stationary transmitter means for transmitting a radiofrequency signal;

mobile receiving means for attachment to an animal capable of receiving said signal;

stimulation means attached to said animal for applying stimulation to the animal in response to signal received by said mobile receiving means;

said mobile receiving means also including mobile transmitter means for transmitting a radiofrequency signal including a predetermined animal identification code.

5. The apparatus in claim 4, said stationary transmitter means also including stationary receiving means for receiving signals transmitted by said mobile transmitter means.

6. The apparatus in claim 5 wherein said mobile transmitter means is activated in response to an activation code transmitted by said stationary transmitter means and received by said mobile receiving means.

7. The apparatus in claim 6, said signal also including information on at least one animal physiological parameter.

8. An apparatus for controlling the location of animal comprising:

two or more transmitters, each transmitter including
means for transmitting a radiofrequency signal including multiple predetermined codes; and
receiving means for receiving signals transmitted by one or more other transmitters;

receiving means for attachment to animal capable of receiving said transmitted signal; and stimulation means attached to said it animal for applying stimulation to the animal in response to said transmitted signal received by said receiving means.

9. The apparatus in claim 8, each transmitter further comprising power control means for varying the signal strength output of said transmitter based on said codes contained in the signals received from other transmitters.

10. The apparatus in claim 9, said stimulation means responsive only to one or more predetermined codes.

11. The apparatus in claim 10, wherein said predetermined codes are assigned based on animal characteristics that warrant different containment treatment.

12. The apparatus in claim 9, wherein said means for varying the signal strength output of said transmitter means includes means for increasing and decreasing signal strength so that each transmitter means is in communication with adjacent transmitter means.

13. The apparatus in claim 12, including means for periodic recalibration by decreasing signal strength and then increasing it to the point that that each transmitter means is in communication with, and there is minimal signal overlap between, adjacent transmitter means.

* * * * *